United States Patent [19]

Santos

[11] Patent Number: 5,117,183
[45] Date of Patent: May 26, 1992

[54] ASYMMETRIC MAGNETIZATION FIXTURE

[75] Inventor: Alfred J. Santos, Canton Center, Conn.

[73] Assignee: The Torrington Company, Torrington, Conn.

[21] Appl. No.: 600,647

[22] Filed: Oct. 18, 1990

Related U.S. Application Data

[62] Division of Ser. No. 482,693, Feb. 21, 1990, Pat. No. 5,097,209.

[51] Int. Cl.$^5$ .................. G01N 27/72; G01R 33/12; H01F 7/20; H01F 13/00
[52] U.S. Cl. ..................................... 324/228; 335/284
[58] Field of Search ................ 324/228; 361/143, 148; 335/284

[56] References Cited

FOREIGN PATENT DOCUMENTS 59-159653  9/1984  Japan ..................................... 335/284

*Primary Examiner*—Walter E. Snow
*Attorney, Agent, or Firm*—Michael H. Minns; John C. Bigler

[57] ABSTRACT

A high resolution sensor for internal combustion engines has symmetric and asymmetric magnetic encoders mounted on a support plate for synchronous rotation with the engine. Hall-effect sensor devices monitor the magnetic fields of the encoders and transmit signals to an Electronic Engine Control Unit. Ignition and fuel injection timing are deduced from the positions of the magnetic encoders. The encoders are magnetized on a fixture which establishes the size, strength, and location of each pole.

17 Claims, 5 Drawing Sheets

ASYMMETRIC MAGNETIZATION FIXTURE

This is a division of application Ser. No. 482,693 filed Feb. 21, 1990, now U.S. Pat. No. 5,097,209.

BACKGROUND OF THE INVENTION

This invention relates generally to an ignition spark timing control system, and more particularly to a system having magnetic sensing capabilities for timing the ignition to the engine shaft position.

Virtually all internal combustion enginess manufactured today include an electronic control unit which monitors and controls ignition timing. Functions which were once controlled through various mechanical linkages are increasingly controlled in the electronic control unit. With this control arrangement, timing of engine spark and fuel injection functions with the valve of each cylinder can be precisely controlled. This precision provides greater efficiency and responsiveness of engine to varying conditions of operation.

Distributor sensors used today typically produce one pulse, or one rising edge, for each spark plug to be fired.

Many currently used distributors do not provide information required to control the fuel injection system. Further, such systems do not provide information to the electronic control unit to indicate which spark plug is being fired. In such systems, the electronic control unit controls spark advance with respect to valve and fuel injector timing by estimating engine speed between sensor signals and delaying the spark for a calculated time after a sensor signal has been received.

Okada et. al, in U.S. Pat. No. 4,742,811, disclosed an ignition timing control system using three axially adjacent columns of magnets attached to a shaft. Each magnet column rotates in relation to a Hall-sensor which generates a signal at various degrees of shaft rotation. The first row of magnets is symmetrically spaced about the column. The second row is asymetrically spaced; while the third row is symmetrically spaced, but has one pulse which is differentiated from the others by very small pole reversals at the end of the pulse. Processing of these three signals through the electronic control unit provides the discrimination capability necessary to proper functioning of the system.

The disposition of the magnetic columns one above the other in the Okada patent requires a substantial minimum height for the assembly described. Moreover, the twenty-four symmetrical poles in the first column indicates that each pole is subtending an angle of fifteen degrees on the circumference of the column. This rather large pulse to angle equivalence acts to limit the precision of the device function. The imprecision is overcome by the use of three magnetized columns rather than the lesser number.

U.S. Pat. No. 3,373,729, to Lemen, discloses an electronic ignition system for internal combustion engines which uses a disk having a plurality of equally spaced magnets about its periphery. The disk is sawed perpendicular to its axis to form a slot having axially opposed magnets in the disk periphery on both sides of the slot. A Hall-sensor placed within the slot generates triggering signals according to the fluctuating magnetic field experienced as the disk rotates. This device, in essence, serves to replace the breaker points found in the distributor of a standard mechanically timed ignition system. Thus, this invention eliminates the mechanical contact points together with their shortcomings, but it does not improve the accuracy of the ignition and fuel injection timing.

The foregoing illustrates limitations known to exist in present devices and methods. Thus, it is apparent that it would be advantageous to provide an alternative directed to overcoming one or more of the limitations set forth above.

Accordingly, a suitable alternative is provided including features more fully disclosed hereinafter.

SUMMARY OF THE INVENTION

In one aspect of the present invention, this is accomplished by providing a high resolution sensor system for internal combustion engines including: first and second magnetic encoding rings suitably mounted for synchronous movement with the engine; and first and second signal pickup means located near the path of movement of the first and second magnetic encoder means. The magnetic encoders of this invention are made on a magnetizing fixture having an electrically conductive wire laid on a support in a planar serpentine path and further having magnetic field modifiers placed within the conductor loops to vary the size, strength, and location of each magnetic pole formed.

The foregoing and other aspects will become apparent from the following detailed description of the invention when considered in conjunction with the accompanying drawing figures. It is to be expressly understood, however, that the drawing figures are not intended as a definition of the invention, but are for the purpose of illustration only.

BRIEF DESCRIPTION OF THE DRAWINGS

FIG. 12 is a plan view of a magnetizing fixture, similar to

FIG. 11, showing multiple magnetizing loops and a different sequence of magnetic field modifiers.

DETAILED DESCRIPTION

Figure 1:
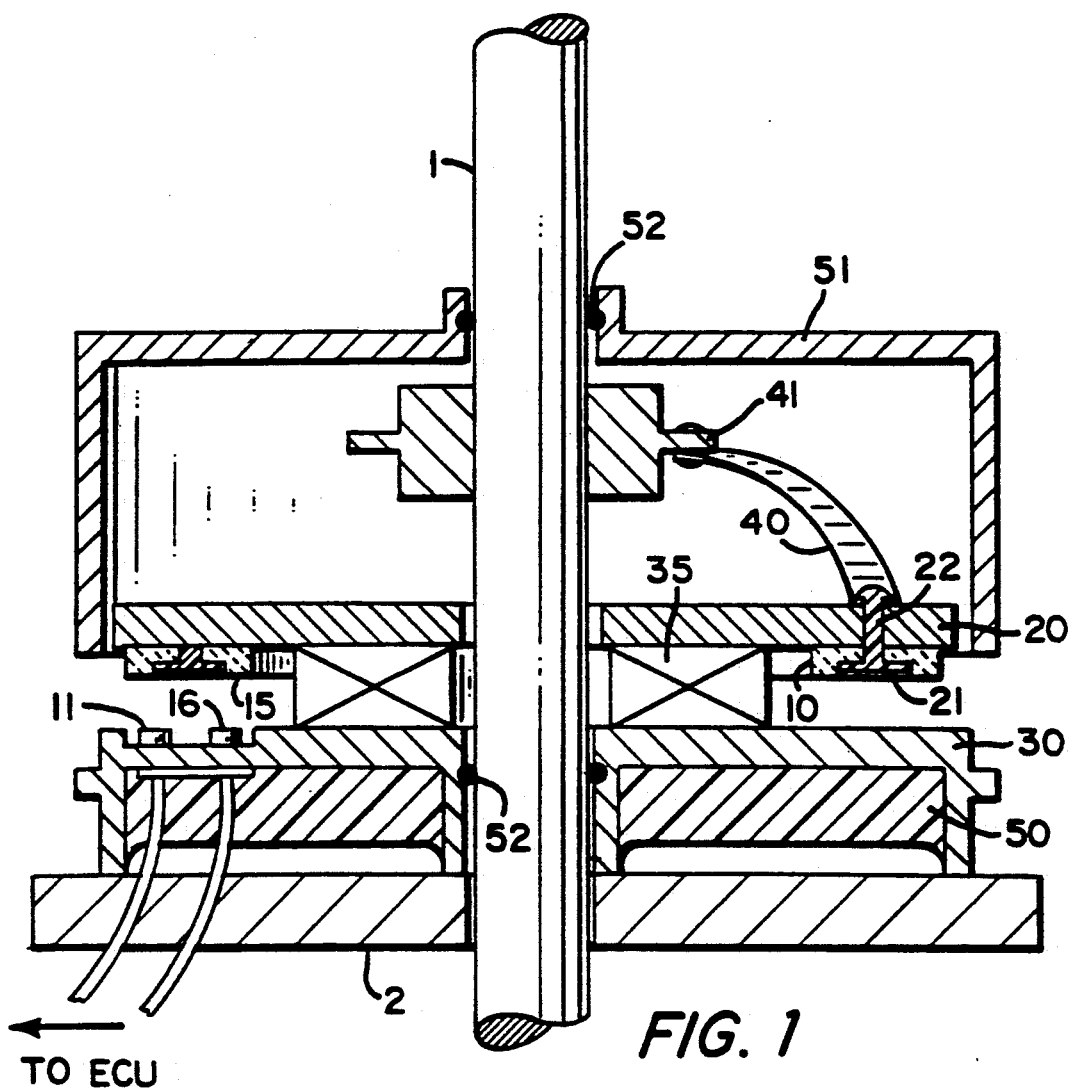
FIG. 1 is a fragmentary partially sectional elevation view of the sensor system.

In FIG. 1, is shown a fragmentary partially sectioned elevation view of one embodiment of the invention. The high resolution sensing system is preferably designed to mount on an existing automobile distributor base; however, it could as well be mounted anywhere on or in the engine where it could be driven synchronously with the crankshaft or cam shaft of the engine.

In this embodiment is seen the distributor shaft 1, which serves to drive the rotary member of the sensor system, protruding through the stationary distributor base 2, upon which is mounted the sensor housing 30. The high resolution magnetic encoder 10 and the low resolution magnetic encoder 15 are mounted on support plate 20 which rides on bearing/spacer 35. The encoder rings 10 and 15 are attached to the support plate using retainer ring 21 which has projecting studs 22 which protrude through holes in the support plate 20 and drive spring 40. The studs 22 of retainer 21 are upset, threaded, or otherwise secured to capture the assembly.

High resolution sensor 11 and low resolution sensor 16 are mounted at appropriate radial locations to provide alignment with the high resolution magnetic encoder 10 and low resolution magnetic encoder 15, respectively. The sensors are Hall-effect transducers which provide appropriate output regardless of speed of motion. The signals generated in the sensors are transmitted to the electronic control unit of the engine.

Upper drive hub 41 is coupled to the distributor shaft by which it is rotatively driven. Drive spring 40 extends from the upper drive hub 41 to the support plate 20 and provides the driving connection between the two plates. Drive spring 40 is so designed that it accommodates small vertical displacements of distributor shaft 1 without causing any relative rotation between upper drive hub 41 and support plate 20. This feature is required to avoid changes of timing which could otherwise be induced by vertical movement of the distributor shaft 1.

A cover 51 is provided to protect the sensor system from damage or contamination. Optional seals 52 are provided for the interface between cover 51 and distributor shaft 1 as well as sensor housing 30 and distributor shaft 1. The seals may be O-rings or other suitable sealing devices. The cover 51 is placed on the housing 30 and secured with adhesive or other appropriate sealing means. The underside of housing 30 is filled with a castable encapsulant 50 which protects the printed wiring board and other electronics of the sensor system.

Figure 2:
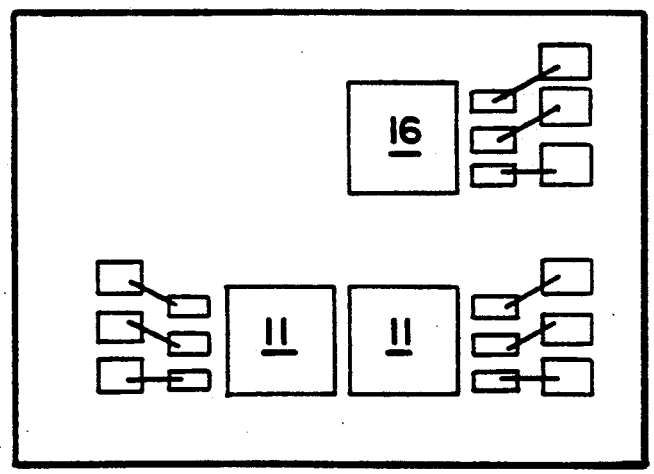
FIG. 2 is a schematic plan view of the magnetic field sensors.

High resolution sensor 11 and low resolution sensor 16 are shown schematically in a plan view in FIG. 2. Here, it can be seen that the high resolution sensor consists of two Hall-effect transducers and their associated electronics. This provides high resolution by doubling the number of signals generated in the sensors in response to each magnetic pole reversal on the high resolution magnetic encoder ring 10. Only one Hall-effect transducer is used on low resolution sensor 16.

Figure 3:
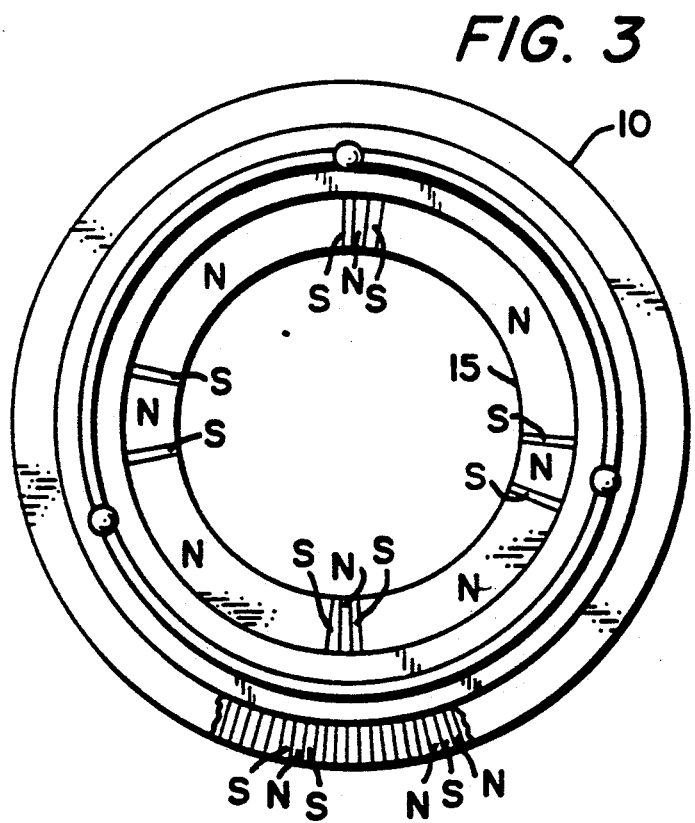
FIG. 3 is a schematic plan view of the two magnetic encoders.

FIG. 3 shows a schematic plan view representative of high resolution magnetic encoder ring 10 and low resolution magnetic encoder ring 15. High resolution encoder ring 10 has a large number of magnetic poles. In the preferred embodiment, this ring will have 360 poles, but it could have more or fewer as the engine design requires. Low resolution magnetic encoder ring 15 is shown with sixteen poles, as an example, for a four-cylinder engine. There are four sharp North poles, eight intermediate South poles, and four very weak, very diffuse North poles. The four sharp North poles, one for each cylinder, are used to indicate which cylinder requires either spark or fuel. This is done by providing poles of different angular extent. For instance, it would be possible to have poles of one degree, two degrees, three degrees, and four degrees to indicate the respective cylinders to which they apply. Thus, in a four cylinder engine, the three degree magnet would correspond to the number three cylinder. Note that all timing is done on the rising edge of the magnetic pulse.

Figure 4:
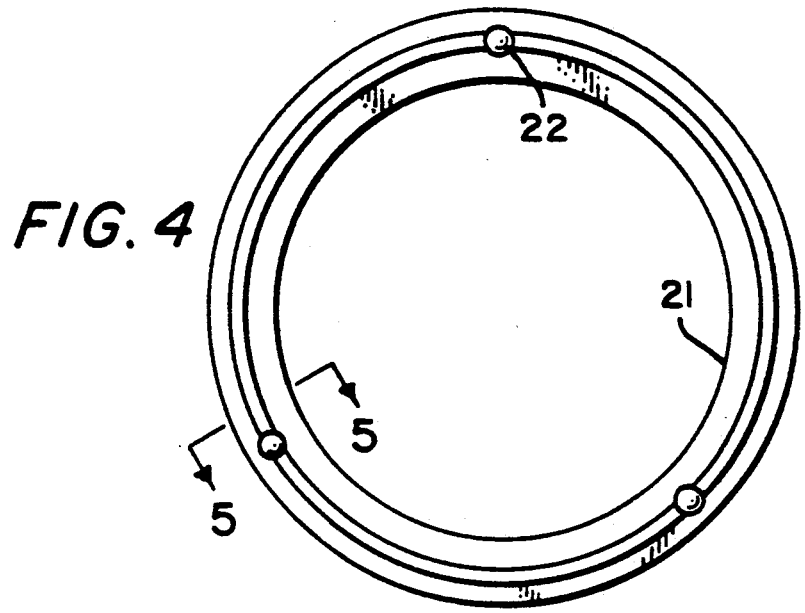
FIG. 4 is a schematic plan view of the retainer device.
Figure 5:
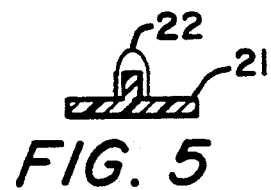
FIG. 5 is a sectional view of the retainer seen from line 5—5 in FIG. 4.

Retainer ring 21 is shown in FIGS. 4 and 5. From these, it is seen that magnet retainer ring 21 is annular in shape and has a "T"-cross-section. In addition, it has a plurality of projecting studs 22 which are used to secure the ring and the magnets to the thrust washer plate or support plate 20. Depending on the magnet mounting scheme employed, the retainer ring may also be made with an "L"-cross-section.

The projecting studs 22 protrude through the gap between the two magnet rings 10 and 15, through support plate 20, and through drive spring 40. Drive spring 40 transmits the rotary driving force between upper drive plate 41 coupled to distributor shaft 1, and support plate 20. It is also maintains firm contact between support plate 20 and bearing/spacer 35.

Figure 6:
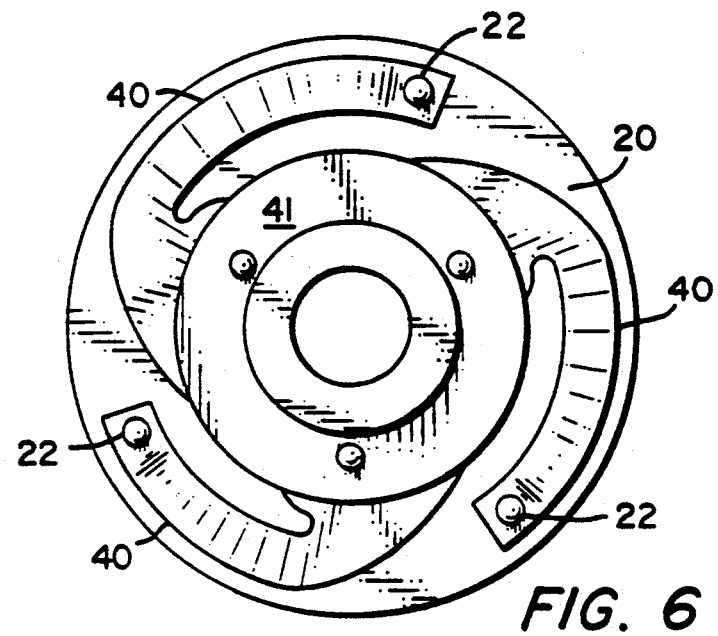
FIG. 6 is a schematic plan view, from above, of the upper drive hub, the support plate, and the drive spring.

FIG. 6 shows a schematic plan view of upper drive hub 41, drive spring 40, lower drive plate 42, and projecting studs 22. Spring 40 is shown here as having three legs, but it could as well have been shown with more or fewer legs depending on design requirements.

Figure 7:
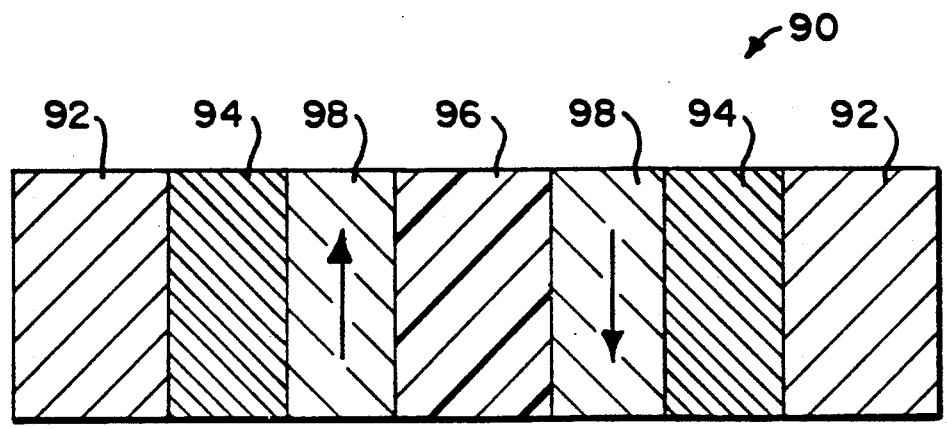
FIG. 7 is an enlarged fragmentary plan view of a magnetizing fixture showing a single magnetizing loop for a South-North-South cycle.
Figure 8:
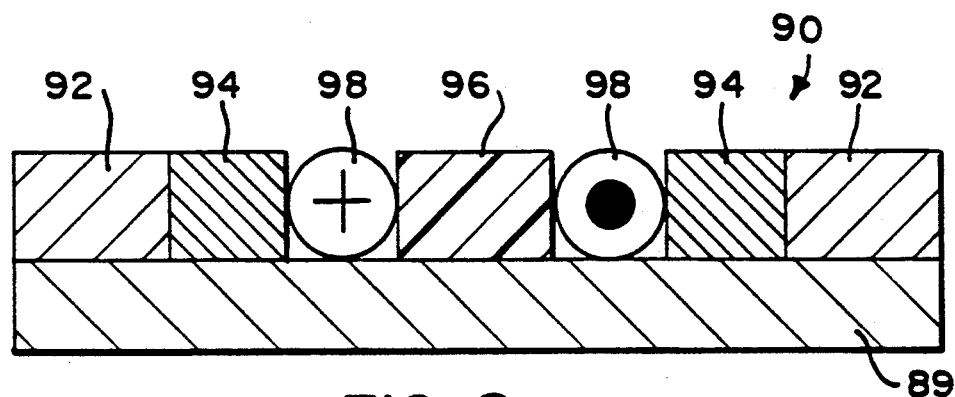
FIG. 8 shows an elevation view of the same magnetizing figure segment as that shown in FIG. 7.

FIGS. 7 and 8 show a plan view and an elevation view of a section of a fixture 90 used for asymetrically magnetizing the low resolution magnetic encoder ring. It consists of a steel base plate 89 upon which is placed an eletrically conductive wire 98 in a planar sertpentine pattern along the surface of the fixture. The sizes of the individual loops in the conductor wire 98 are determined by the size of magnetic pole desired at that loop. When magnetizing an article on this fixture, the article would be placed flat on top of the fixture. When a pulse of very high amperage is passed through conductor 98, magnetic poles are produced in steel base plate 89 and in the magnetic material that has been placed on top of the fixture. The aluminum or plastic mangetic field modifier 96 serves a dual purpose. First, it acts as a spacer for the loop in the conductor wire 98; and second, if aluminum, it serves to slightly reduce the strength of the North pole produced in the work piece being magnetized above the area within the loop of conductor wire 98. The steel magnetic field modifiers 94 serve to intensify the strenth of the magnetic poles induced in the work piece above the modifiers, while the aluminum magnetic field modifiers 92 serve to reduce the strength of the poles, and indeed cause a squeezing or a sharpening of the poles above the steel field modifiers 94.

Note that steel modifiers intensify the field strength of the pole formed above them; air or plastic is essentially neutral, neither intensifying nor weakening the field; while aluminum serves to essentially repel the field, or cause it to distort so that it concentrates more in the regions adjacent to the intensifying or neutral modifiers. Thus, by proper selection of the amperage and duration of the magnetizing current pulse, the sizes of the loops in the conductor wire 98, the sizes and placement of the magnetic field modifiers 92, 94, and 96, and the selection of material and the sequence of placement of the magnetic field modifiers, the sizes, strengths, and locations of the magnetic poles on the work piece being magnetized can be very accurately controlled.

Figure 9:
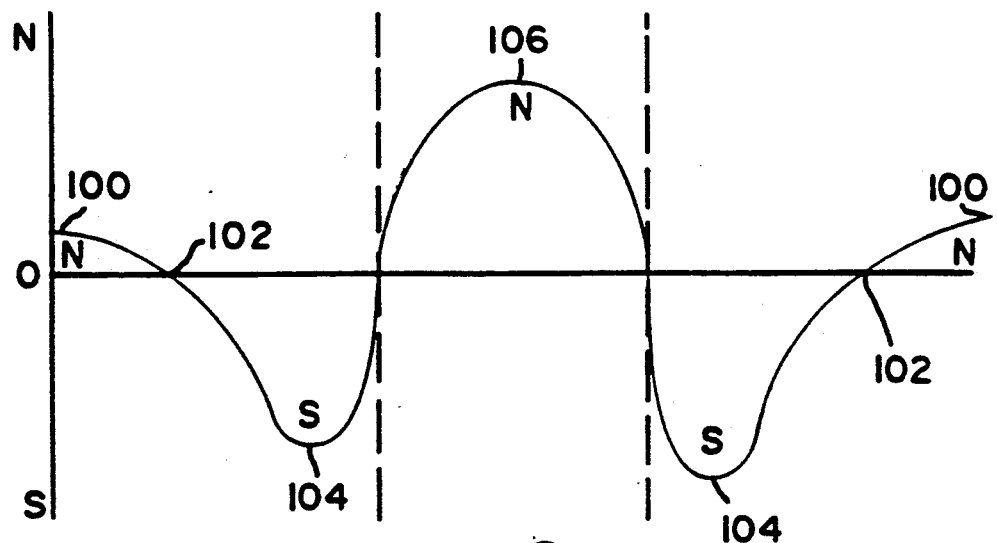
FIG. 9 shows the asymmetric magnetization produced by the magnetization fixture of FIGS. 7 and FIG. 8.

FIG. 9 is a schematic representation of the magnetic pole array produced by the asymmetrical magnetizing fixture of FIGS. 7 and 8. The strong North pole 106 is produced at the center of the fixture segment shown in FIGS. 7 and 8. The somewhat weaker and sharper South poles 104 correspond to the placement of the steel magnetic field modifiers 94 while the South 104 to weak North pole 100 boundary 102 occurs approximately above the aluminum magnetic field modifiers 92. The magnetic flux from any one of the magnetic poles is proportional to the field strength of that pole. In a magnetized ring, the total magnetic flux from all the North poles must equal the total magnetic flux from, or into, all of the South poles. Thus, in the curve shown in FIG. 9 the magnetic field strength is represented by the vertical axis, and the magnetic flux is proportional to the area of the curve above or below the horizontal axis. If all the poles on a circular magnetic ring were represented in a figure such as this, the total area under all the North poles would be equal to the total area over all the South poles.

Figure 10:
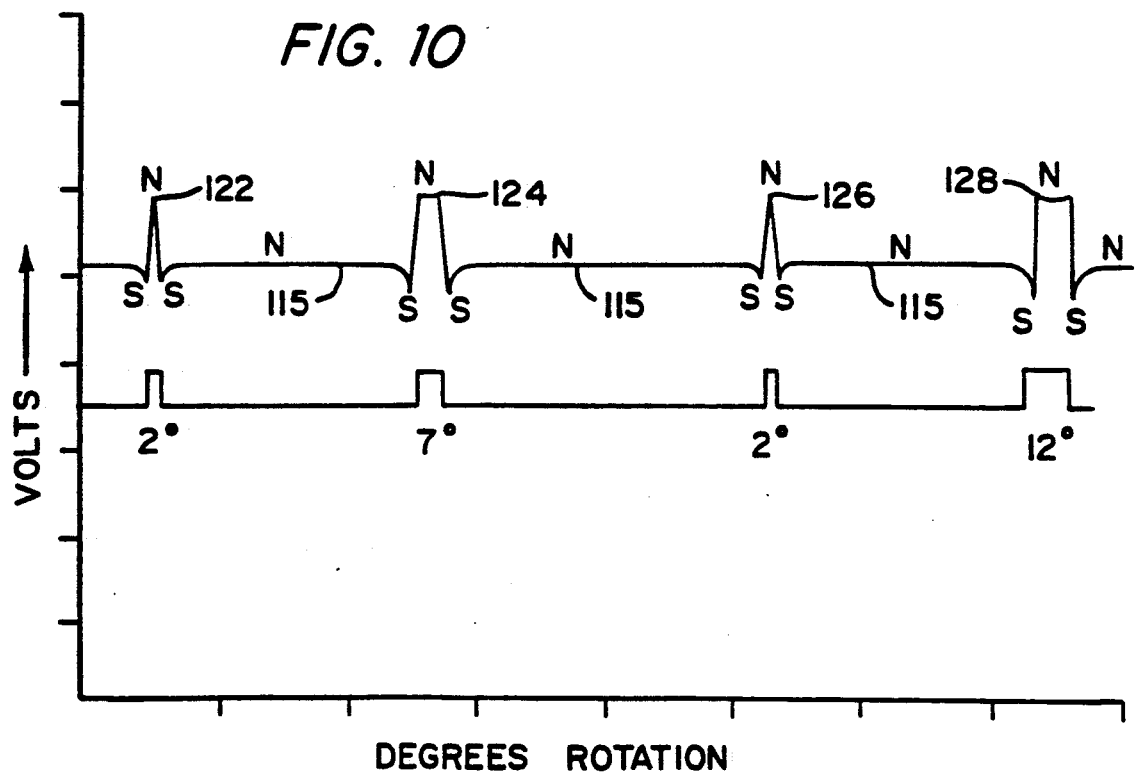
FIG. 10 shows a representation of the analog and digital signals detected by the magnetic field sensor from the asymmetric magnetic encoder.

FIG. 10 shows a schematic representation of the analog 120 and digital 130 signal resulting from one revolution of the low resolution magnetic encoder 15. The analog trace 120 represents the raw output of the Hall sensor. The digital trace 130 represents that same output after conditioning of the signal in the sensor circuitry. These traces illustrate the asymmetry which provides the discrimination that permits the proper cylinder to receive the spark signal. In this case, every other pulse subtends two degrees of angle. Pulses 122 and 126 are each two degree pulses, while pulses 124 and 128 are seven degree and twelve degree pulses, respectively. The analog, or unconditioned, signal indicates a total of sixteen poles, or eight dispoles for the full magnetic encoder ring. The digital trace 130 shows only four pulses generated by these sixteen poles. This is accomplished by the signal conditioning which is designed to only recognize positive, or North, magnetic field strengths having greater magnitudes than those of the diffuse North poles 115. Thus, the digital trace 130 only recognizes the four strong North poles 122, 124, 126, and 128. Hence, only four pluses are transmitted to the electronic control unit by the low resolution sensor circuit for each revolution of the low resolution encoder ring 15. The timing function is controlled from the rising of each pulse while the discrimination function is determined by the angular width of each pulse.

The high resolution magnetic encoder ring 10 is, of course, turning synchronously with the low rersolution magnetic encoder ring 15. Since the high resolution encoder ring 10 has 360 poles, and since it has two high resolution magnetic field sensors 11 associated with it, there are 720 pulses produced for each revolution of the high resolution encoder ring 10. This provides half degree resolution without interpolations, and even closer resolution with interpolations.

Figure 11:
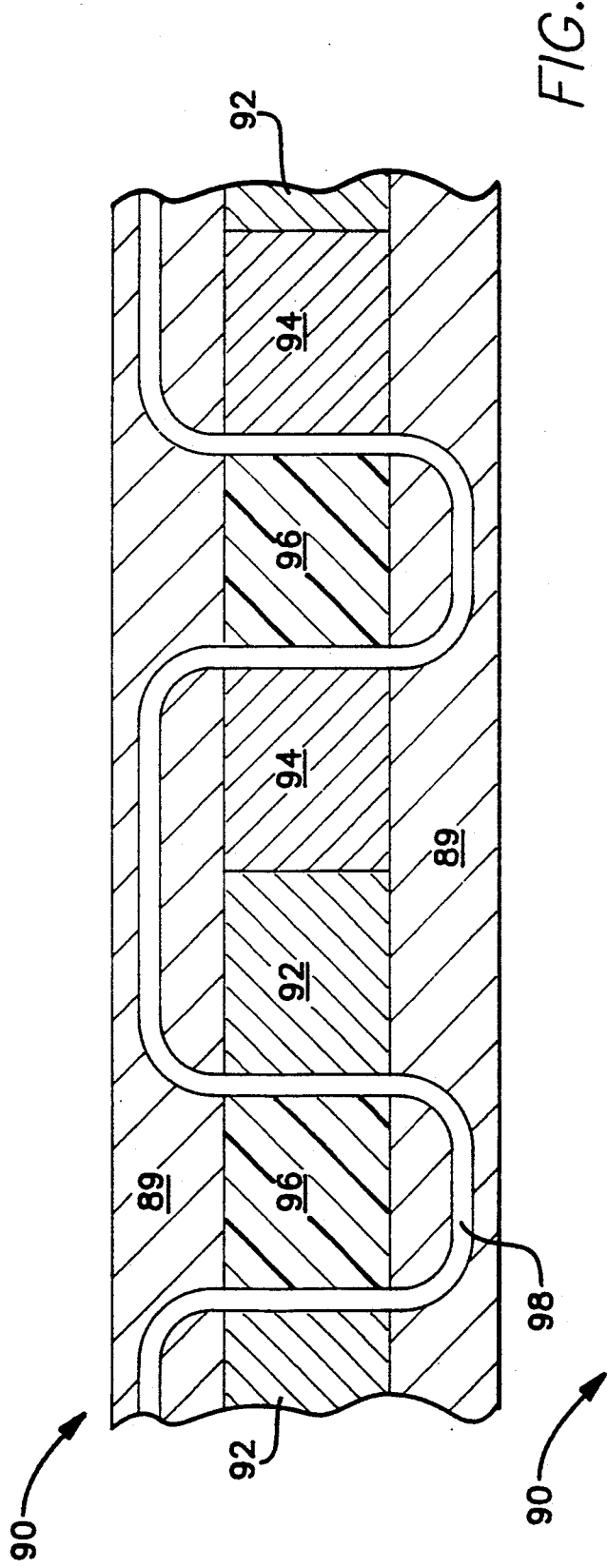
FIG. 11 is a plan view of a magnetizing fixture, similar to FIG. 7, showing multiple magnetizing loops for multiple South-North-South cycles.
Figure 12:
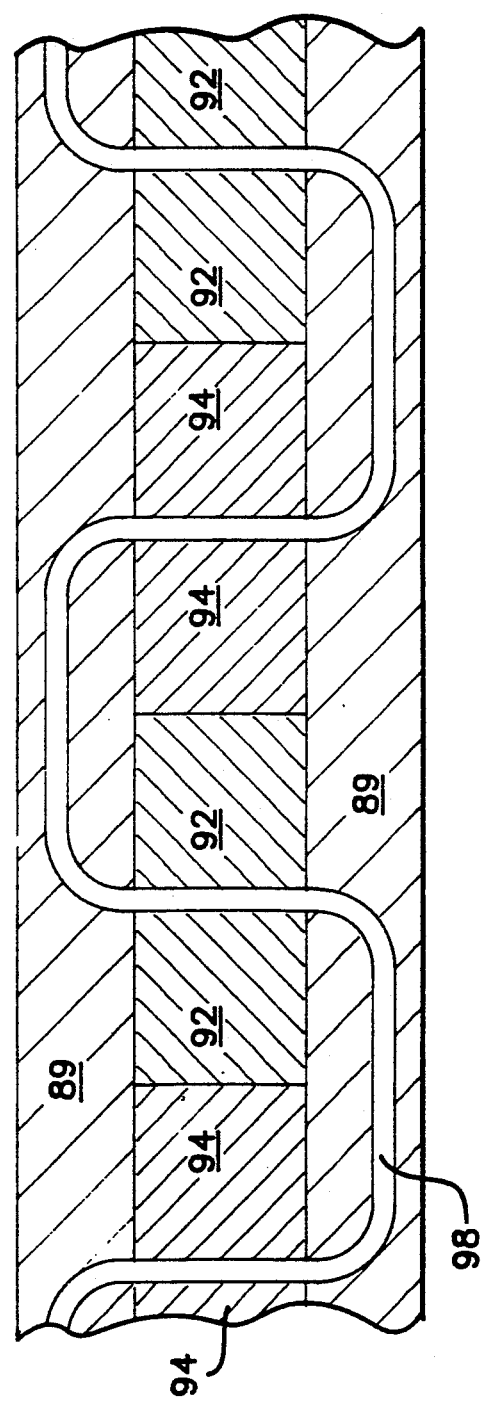
Figure 11:
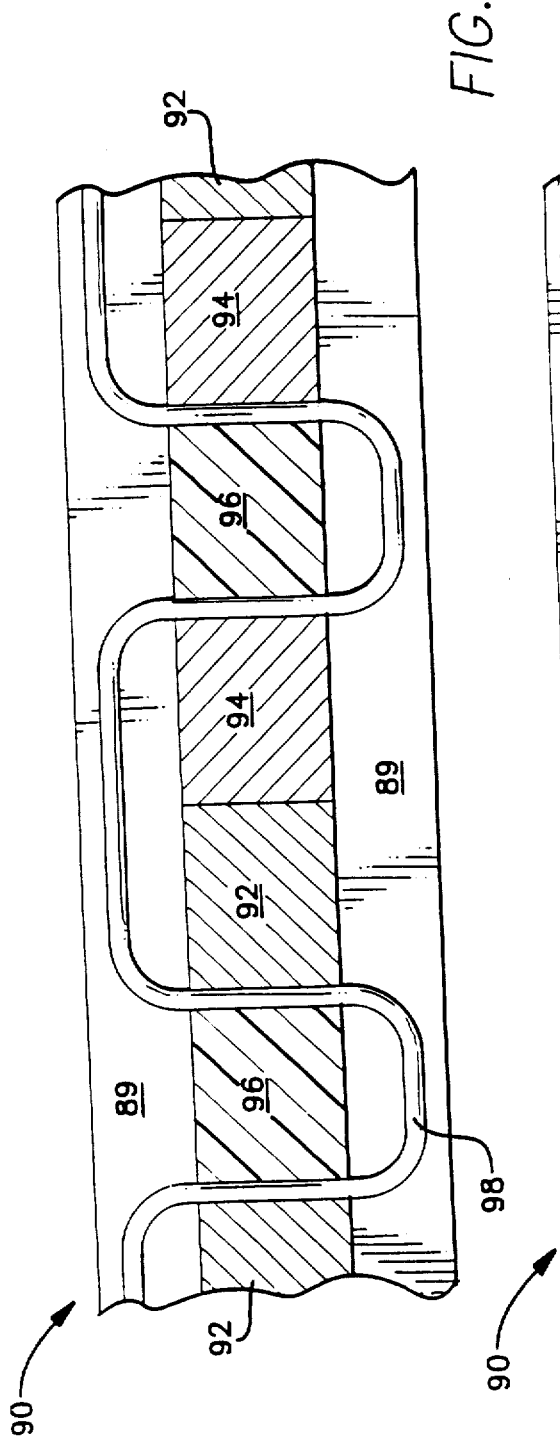
Figure 12:
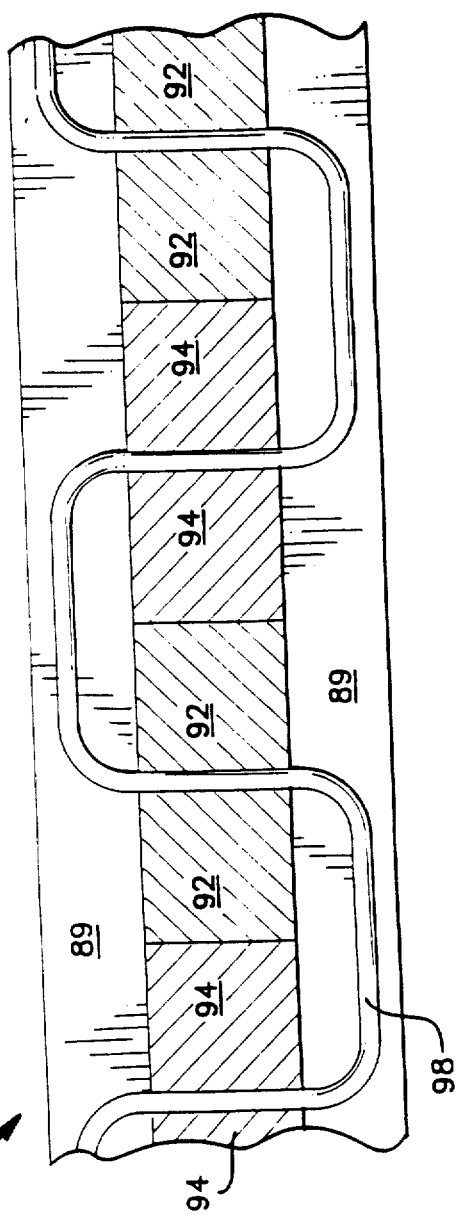

FIGS. 11 and 12 are plan views similar to FIG. 7 but showing a larger portion of the fixture 90 used for asymmetrically magnetizing the low resolution magnetic encoder ring. Those figures illustrate the previously described planar serpentine pattern of the conductive wire 98 along the base plate 89 as well as alternative sequences of the magnetic field modifiers 92, 94, and 96 to achieve the desired size, strength and locations of the magnetic poles.

Having described the invention, what is claimed is:

1. A fixture for magnetizing a magnetic material to produce magnetic poles of non-uniform strength, the fixture comprising:
    a support;
    an electrically conductive wire disposed in a planar serpentine path on said support forming a plurality of serpentine loops; and
    a plurality of magnetic field intensifiers and magnetic field suppressors, the magnetic field intensifiers and magnetic field suppressors being placed in the areas of said support between the serpentine loops of the conductive wire whereby the strength of adjacent magnetic poles produced in non-uniform.

2. A fixture according to claim 1 wherein the strength of a magnetic pole being produced is greater than the strength of adjacent magnetic poles being produced.

3. A fixture according to claim 1 wherein the magnetic field suppressors are diamagnetic material.

4. A fixture according to claim 1 wherein the magnetic field intensifiers are ferromagnetic material.

5. A fixture according to claim 1 wherein a spacer material is located within a first serpentine loop, magnetic field intensifiers being located in the adjacent serpentine loops and proximate the first serpentine loop, and magnetic field suppressors being located in the adjacent serpentine loops proximate the magnetic field intensifiers and distal the first serpentine loop.

6. A fixture according to claim 5 wherein said spacer material is selected from the group consisting of air, plastic, aluminum and steel depending upon the desired strength of the magnetic pole produced by said first serpentine loop.

7. A fixture according to claim 1 wherein a spacer material is located within a first serpentine loop, magnetic field suppressors being located in the adjacent serpentine loops and proximate the first serpentine loop, and magnetic field intensifiers being located in the adjacent serpentine loops proximate the magnetic field suppressors and distal the first serpentine loop.

8. A fixture according to claim 7 wherein said spacer material is selected from the group consisting of air, plastic, aluminum and steel depending upon the desired strength of the magnetic pole produced by said first serpentine loop.

9. A fixture according to claim 1 wherein a magnetic field intensifier and a magnetic field suppressor are located within a first serpentine loop.

10. A fixture according to claim 9 wherein the magnetic field intensifier in the first serpentine loop is proximate a magnetic field intensifier in an adjacent serpentine loop and the magnetic field suppressor in the first serpentine loop is proximate a magnetic field suppressor in an adjacent serpentine loop.

11. A fixture for magnetizing a magnetic material to produce magnetic poles of non-uniform strength, the fixture comprising:
    a support;
    an electrically conductive wire disposed in a planar serpentine path on said support forming a plurality of serpentine loops;
    a spacer material; and
    a pluality of magnetic field intensifiers and magnetic field suppressors, the spacer material is located within a first serpentine loop, the magnetic field suppressors being located in the adjacent serpentine loops and proximate the first serpentine loop, and the magnetic field intensifiers being located in the adjacent serpentine loops proximate the magnetic field suppressors and distal the first serpentine loop whereby the strength of adjacent magnetic poles produced is non-uniform.

12. A fixture according to claim 11 wherein the magnetic field suppressors are diamagnetic material.

13. A fixture according to claim 11 wherein the magnetic field intensifiers are ferromagnetic material.

14. A fixture according to claim 11 wherein said spacer material is selected from the group consisting of air, plastic, aluminum and steel depending upon the desired strength of the magnetic pole produced by said first serpentine loop.

15. A fixture for magnetizing a magnetic material to produce magnetic poles of non-uniform strength and non-uniform spacing, the fixture comprising:

a support;

an electrically conductive wire disposed in a planar serpentine path forming a plurality of serpentine loops on said support, the serpentine loops having non-uniform spacing; and a plurality of magnetic field intensifiers and magnetic field suppressors the magnetic field intensifiers and magnetic field suppressors being placed in the areas of said support between the serpentine loops of the conductive wire whereby the strength of adjacent magnetic poles produced is non-uniform and the spacing of the magnetic poles produced in non-uniform.

16. A fixture according to claim 15 wherein the magnetic field suppressors are disamagnetic material.

17. A fixture according to claim 15 wherein the magnetic field intensifiers are ferromagnetic material.

* * * * *

UNITED STATES PATENT AND TRADEMARK OFFICE
CERTIFICATE OF CORRECTION

PATENT NO. : 5,117,183
DATED : May 26, 1992
INVENTOR(S) : Alfred J. Santos

Page 1 of 2

It is certified that error appears in the above-identified patent and that said Letters Patent is hereby corrected as shown below:

IN THE DRAWINGS

Delete Drawing Sheets 1 and 5, and substitute therefor the Drawings Sheets consisting of Figs. 1, and 11-12, as shown on the attached pages.

Signed and Sealed this

Fifth Day of October, 1993

Attest:

BRUCE LEHMAN

Attesting Officer

*Commissioner of Patents and Trademarks*